(12) United States Patent
Yoshikawa (10) Patent No.: US 10,168,237 B2
(45) Date of Patent: Jan. 1, 2019

(54) TORQUE DETECTOR

(71) Applicant: SUBARU CORPORATION, Tokyo (JP)

(72) Inventor: Muneki Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 86 days.

(21) Appl. No.: 15/483,899

(22) Filed: Apr. 10, 2017

(65) Prior Publication Data

US 2017/0336277 A1    Nov. 23, 2017

(30) Foreign Application Priority Data

May 19, 2016 (JP) ................. 2016-100159

(51) Int. Cl.
*G01L 3/14* (2006.01)
*F16H 61/662* (2006.01)

(52) U.S. Cl.
CPC ........ *G01L 3/1435* (2013.01); *F16H 61/6625* (2013.01)

(58) Field of Classification Search
CPC .......................... G01L 3/1435; F16H 61/6625
See application file for complete search history.

(56) References Cited

U.S. PATENT DOCUMENTS

| | | |
|---|---|---|
| 4,689,036 A | 8/1987 | Love |
| 5,667,448 A | 9/1997 | Friedmann |
| 5,711,730 A | 1/1998 | Friedman et al. |
| 6,017,286 A | 1/2000 | Friedmann |
| 6,068,565 A * | 5/2000 | Riemer ............... F16H 57/0456 474/18 |
| 6,983,664 B2 * | 1/2006 | Tokumoto ............... B62D 6/10 73/862.329 |
| 8,742,750 B2 * | 6/2014 | Kess ....................... G01P 3/488 324/207.25 |
| 9,625,332 B2 * | 4/2017 | Saito ....................... G01L 3/104 |

FOREIGN PATENT DOCUMENTS

| | | |
|---|---|---|
| JP | 2006-029379 A | 2/2006 |
| JP | 3771958 B2 | 5/2006 |
| JP | 3961039 B2 | 8/2007 |
| JP | 3989565 B2 | 10/2007 |

OTHER PUBLICATIONS

JPO Decision to Grant a Patent dated Nov. 28, 2017 in Japanese Application No. 2016-100159.

* cited by examiner

*Primary Examiner* — Freddie Kirkland, III
(74) *Attorney, Agent, or Firm* — McGinn IP Law Group, PLLC.

(57) ABSTRACT

A torque detector includes a torque cam, a pulse gear, a rotation pulse detection member, and a torque acquisition member. The torque cam is disposed on a rotating shaft and capable of moving in an axial direction of the rotating shaft according to torque input to the rotating shaft. The pulse gear includes a tooth formed on an outer circumferential surface of the torque cam. The rotation pulse detection member disposed so as to oppose the pulse gear is configured to detect the tooth of the pulse gear in rotation and to output a pulse train. The torque acquisition member is configured to acquire the torque from the pulse train. The tooth extends in the axial direction and a tooth thickness becomes continuously larger or smaller from a first side to a second side in the axial direction.

15 Claims, 5 Drawing Sheets

TORQUE DETECTOR

CROSS-REFERENCE TO RELATED APPLICATIONS

The present application claims priority from Japanese Patent Application No. 2016-100159 filed on May 19, 2016, the entire contents of which are hereby incorporated by reference.

BACKGROUND

1. Technical Field

The present invention relates to a torque detector that is capable of detecting torque input to a continuously variable transmission of a vehicle.

2. Related Art

In recent years, a continuously variable transmission (CVT) that is capable of changing the gear ratio in a non-stepped manner is widely and practically used as an automatic transmission of a vehicle. The continuously variable transmission includes a primary pulley provided on an input shaft (a primary shaft), a secondary pulley provided on an output shaft (a secondary shaft), and a chain that is stretched across the pulleys. The gear ratio is changed in a non-stepped manner by changing the groove width of each pulley to change the winding diameter of the chain. In the continuously variable transmission, torque generated by the engine is input to the primary shaft and is transmitted by clamping the chain by supplying a hydraulic pressure (a clamp pressure) to each pulley. The clamp pressure is set on the basis of the torque input to the continuously variable transmission.

A method of acquiring the torque input to the continuously variable transmission includes, for example, a method that estimates the torque using an intake air amount of the engine. Furthermore, Japanese Unexamined Patent Application Publication (JP-A) No. 2006-29379 discloses a method in which a strain sensor detects strain, in a radial direction, of bearing retainers that support the shafts of the pulleys of the continuously variable transmission through bearings, and in which the shaft torque is estimated with the detection value and shaft torque information stored in advance.

However, since the method described above of estimating the torque estimates the torque with the intake air amount and the like, the accuracy of the estimation of the torque may, disadvantageously, be low. Furthermore, since the method disclosed in JP-A No. 2006-29379 uses the strain created in the radial direction when a shaft torque is applied to the bearing retainers that support the shafts through the bearings, the accuracy of the shaft torque obtained through the strain in the radial direction may, disadvantageously, be low.

In order to prevent the chain from slipping during transmission of the torque, a margin is added to the clamp pressure set based on the input torque. As the accuracy of the torque input to the continuously variable transmission becomes lower, the margin needed to be added to the generated hydraulic pressure becomes larger. Accordingly, a hydraulic pressure that is higher than the hydraulic pressure needed to clamp the chain is generated in the oil pump that is the source of the hydraulic pressure. With the above, power loss in the oil pump becomes large, and the fuel consumption of the vehicle becomes high. Accordingly, an accurate detection of the torque is awaited in order to reduce the power loss in the oil pump and to improve fuel consumption.

SUMMARY OF THE INVENTION

It is desirable that the above problem is overcome and a torque detector that is capable of accurately detecting torque is provided.

An aspect of the present invention provides a torque detector including a torque cam provided on a rotating shaft and movable in an axial direction of the rotating shaft in accordance with torque input to the rotating shaft, a pulse gear comprising at least one tooth formed on an outer circumferential surface of the torque cam, a rotation pulse detection member disposed so as to oppose the pulse gear, and a torque acquisition member configured to acquire the torque from the pulse train output by the rotation pulse detection member. The rotation pulse detection member is configured to detect the at least one tooth of the pulse gear in rotation and configured to output a pulse train The at least one tooth extends in the axial direction and is formed such that a tooth thickness becomes continuously larger or smaller from a first side to a second side in the axial direction.

The rotating shaft may include a first rotating shaft and a second rotating shaft disposed coaxially with the first rotating shaft, and torque may be transmitted from the first rotating shaft to the second rotating shaft. The torque cam may include a first torque cam member provided on an outer circumference of the first rotating shaft so as to rotate together with the first rotating shaft, a second torque cam member provided on an outer circumference of the second rotating shaft so as to rotate together with the second rotating shaft and to move in an axial direction of the second rotating shaft, and cam balls disposed between a cam surface of the first torque cam member and a cam surface of the second torque cam member. The torque detector may further include an elastic member disposed between a surface on an opposite side of the second torque cam member with respect to the cam surface of the second torque cam member and a predetermined fixing surface. The elastic member may be configured to be stretched and shrank in the axial direction in accordance with a thrust force acting on the second torque cam member with the torque transmitted from the first rotating shaft. The pulse gear may be provided on an outer circumferential surface of the second torque cam member.

The at least one tooth may be formed such that a tooth thickness becomes continuously larger or smaller in a linear manner from a first side to a second side in the axial direction.

The torque acquisition member may be configured to calculate a rate of time in which pulses occupy the pulse train, and is configured to acquire the torque on the basis of the rate.

The first rotating shaft may be an output shaft of torque of an engine of a vehicle. The second rotating shaft may be an input shaft of torque of a continuously variable transmission of the vehicle. The torque acquisition member may be configured in a controller of the continuously variable transmission.

BRIEF DESCRIPTION OF THE DRAWINGS

FIGS. 2A and 2B are diagrams schematically illustrating a configuration of the torque detector according to the example.

FIGS. 4A to 4C are cross-sectional views of the second torque cam member and the pulse gear illustrated in FIG. 3.

DETAILED DESCRIPTION

Hereinafter, an example of the present invention will be described in detail with reference to the drawings. Note that in the drawings, the same or corresponding portions will be denoted with the same reference numerals. Furthermore, in the drawings, the same elements are denoted with the same reference numerals and redundant description will be omitted.

Figure 1:
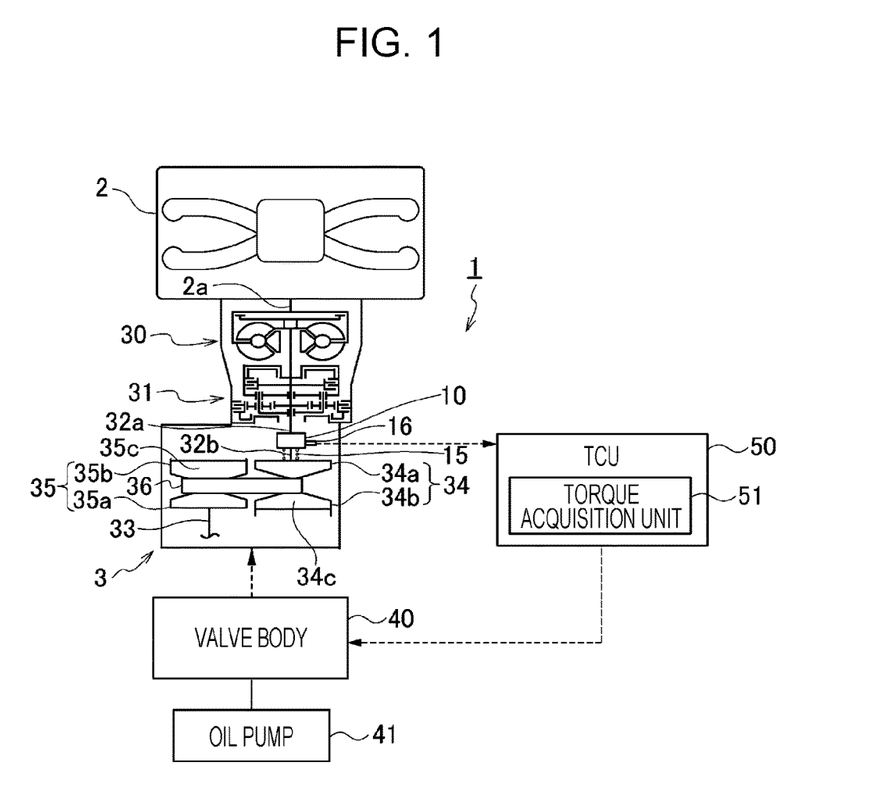
FIG. 1 is a diagram illustrating a configuration of a continuously variable transmission to which the torque detector according to an example is applied.

A torque detector 1 according to the example detects torque input to a chain continuously variable transmission (CVT). Before describing the torque detector 1, an engine 2 and a continuously variable transmission 3 according to the example will be described with reference to FIG. 1. FIG. 1 is a diagram illustrating a configuration of a continuously variable transmission 3 to which the torque detector 1 is applied.

A description of the engine 2 will be given first. While the engine 2 can be of any type, the engine 2 is, for example, a flat-four gasoline engine. The continuously variable transmission 3 is coupled to a crank shaft (an output shaft) 2a of the engine 2. Torque generated in the engine 2 is output to the continuously variable transmission 3 through the crank shaft 2a.

The continuously variable transmission 3 will be described. The continuously variable transmission 3 converts a driving force from the engine 2 and outputs the converted driving force. The continuously variable transmission 3 includes a torque converter 30 and a forward-reverse switching mechanism 31. The torque converter 30 has a clutch function and a torque amplifying function. The forward-reverse switching mechanism 31 includes a function of switching between a normal rotation and a reverse rotation of the driving wheels (the forward movement and the reverse movement of the vehicle). The torque output from the crank shaft 2a of the engine 2 is input to a variator (a primary pulley 34, a secondary pulley 35, and a chain 36) of the continuously variable transmission 3 through the torque converter 30 and the forward-reverse switching mechanism 31. The torque that has been input is transmitted to the variator through two divided shafts (an output shaft 32a and a primary shaft 32b of the forward-reverse switching mechanism 31). The output shaft 32a and the primary shaft 32b are disposed coaxially. The continuously variable transmission 3 includes the primary shaft 32b and a secondary shaft 33 disposed parallel to the primary shaft 32b. In one example, the output shaft 32a may serve as a "first rotating shaft", and the primary shaft 32b may serve as a "second rotating shaft".

The primary shaft 32b is provided with the primary pulley 34. The primary pulley 34 includes a fixed pulley 34a and a movable pulley 34b. The fixed pulley 34a is joined to the primary shaft 32b. The movable pulley 34b is mounted on the primary shaft 32b so as to oppose the fixed pulley 34a. The movable pulley 34b is slidable in an axial direction AD of the primary shaft 32b and is not capable of being rotated in a relative manner. The primary pulley 34 is capable of changing the distance between the cone surfaces of the fixed pulley 34a and the movable pulley 34b (in other words, the pulley groove width).

The secondary shaft 33 is provided with the secondary pulley 35. The secondary pulley 35 includes a fixed pulley 35a and a movable pulley 35b. The fixed pulley 35a is joined to the secondary shaft 33. The movable pulley 35b is mounted on the secondary shaft 33 so as to oppose the fixed pulley 35a. The movable pulley 35b is slidable in an axial direction of the secondary shaft 33 and is not capable of being rotated in a relative manner. The secondary pulley 35 is capable of changing the pulley groove width between the fixed pulley 35a and the movable pulley 35b.

The chain 36 that transmits the driving force is stretched across the primary pulley 34 and the secondary pulley 35. The continuously variable transmission 3 changes the gear ratio in a non-stepped manner by changing the pully groove width of each of the primary pulley 34 and the secondary pulley 35 to change a ratio (a pulley ratio) in which the chain 36 is winded around each of the pulleys 34 and 35. Note that when assuming that the diameter in which the chain 36 is winded around the primary pulley 34 is Rp, and that around the secondary pulley 35 is Rs, the gear ratio i is expressed by i=Rs/Rp.

The movable pulley 34b of the primary pulley 34 includes a primary drive oil chamber (a hydraulic cylinder chamber) 34c. The movable pulley 35b of the secondary pulley 35 includes a secondary drive oil chamber (a hydraulic cylinder chamber) 35c. A gear shift pressure that changes the pulley ratio (a gear ratio) and a clamp pressure that prevents the chain 36 from slipping are introduced to the primary drive oil chamber 34c. A clamp pressure is introduced to the secondary drive oil chamber 35c.

A hydraulic pressure (the gear shift pressure, the clamp pressure) that changes the gear of the continuously variable transmission 3 is supplied by a valve body 40. A control valve mechanism (not shown) is incorporated in the valve body 40. The control valve mechanism supplies, to the primary hydraulic pressure chamber 34c and secondary hydraulic pressure chamber 35c, each of the hydraulic pressures (the gear shift pressure and the clamp pressure) that are pressures generated by regulating the hydraulic pressures (line pressures) of the oil discharged from an oil pump 41 by, for example, opening and closing oil passages included in the valve body 40 that uses a plurality of spool valves (not shown) and solenoid valves (not shown) that move the spool valves. Furthermore, the control valve mechanism supplies regulated pressure to, for example, the forward-reverse switching mechanism 31 that switches between the forward and reverse movement of the vehicle.

The continuously variable transmission 3 is controlled with a transmission control unit (TCU) 50. The TCU 50 is a controller that comprehensively controls the continuously variable transmission 3. The TCU 50 includes a microprocessor that performs computation, a ROM that stores a program and the like that makes the microprocessor execute various processes, a RAM that stores various data such as results of the computation, a RAM for backup that maintains the stored data with a 12V battery, and an input and output I/F. In one example, the TCU 50 may serve as a "controller".

According to a shift map, the TCU 50 automatically controls shifting of the gear ratio according to the driving state of the vehicle. In the above control, the gear shift pressure is generated and the gear ratio is changed by setting a desired value of a primary revolution speed (a revolution speed of the primary pulley 34) so that a predetermined gear ratio is attained, and controlling each of the solenoid valves of the valve body 40 so that the actual primary revolution speed becomes the desired primary revolution speed, for example. The shift map is stored in the ROM inside the TCU 50.

Furthermore, based on the torque input to the primary shaft 32b, the TCU 50 sets the clamp pressure and controls clamping of the chain 36 with the pressure. In the above control, the clamp pressure is generated by setting a clamp pressure according to the input torque using the map and controlling each of the solenoid valves of the valve body 40. A hydraulic pressure amounting to a margin to prevent the chain 36 from slipping and to reliably transmit the input torque from the primary pulley 34 to the secondary pulley 35 is added to the above clamp pressure.

As the accuracy in detecting the torque input to the continuously variable transmission 3 becomes higher, the hydraulic pressure amounting to the clamp pressure can be made smaller (including a case in which the hydraulic pressure amounting to the margin is 0). Accordingly, in the present example, the torque input to the continuously variable transmission 3 is detected in an accurate manner with the torque detector 1.

Figure 2A:
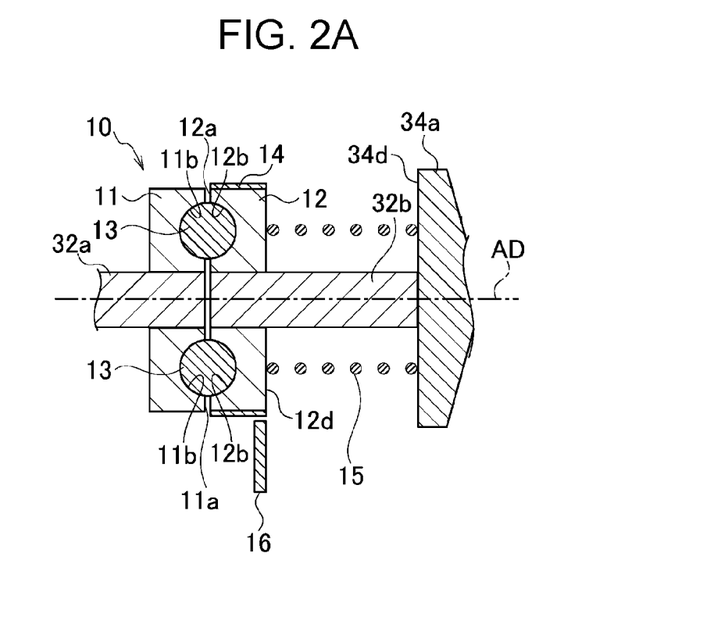
FIG. 2A illustrates a case in which torque in not input to the torque detector and FIG. 2B illustrates a case in which torque is input to the torque detector.
Figure 2B:
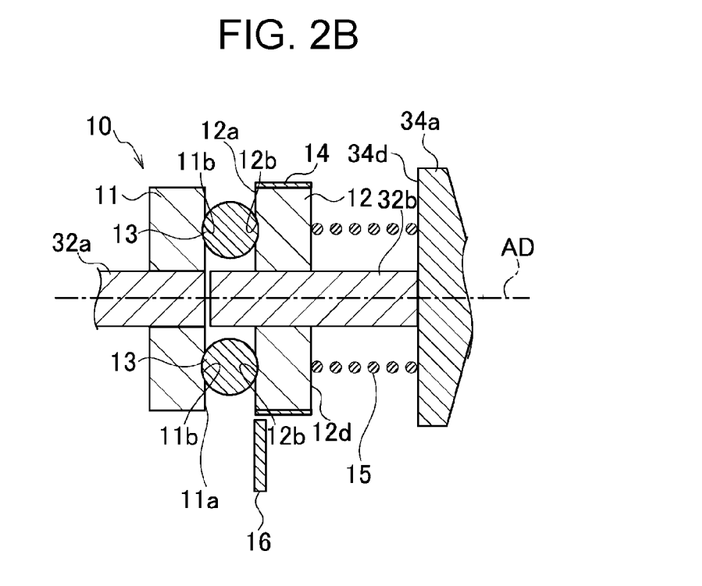
Figure 3:
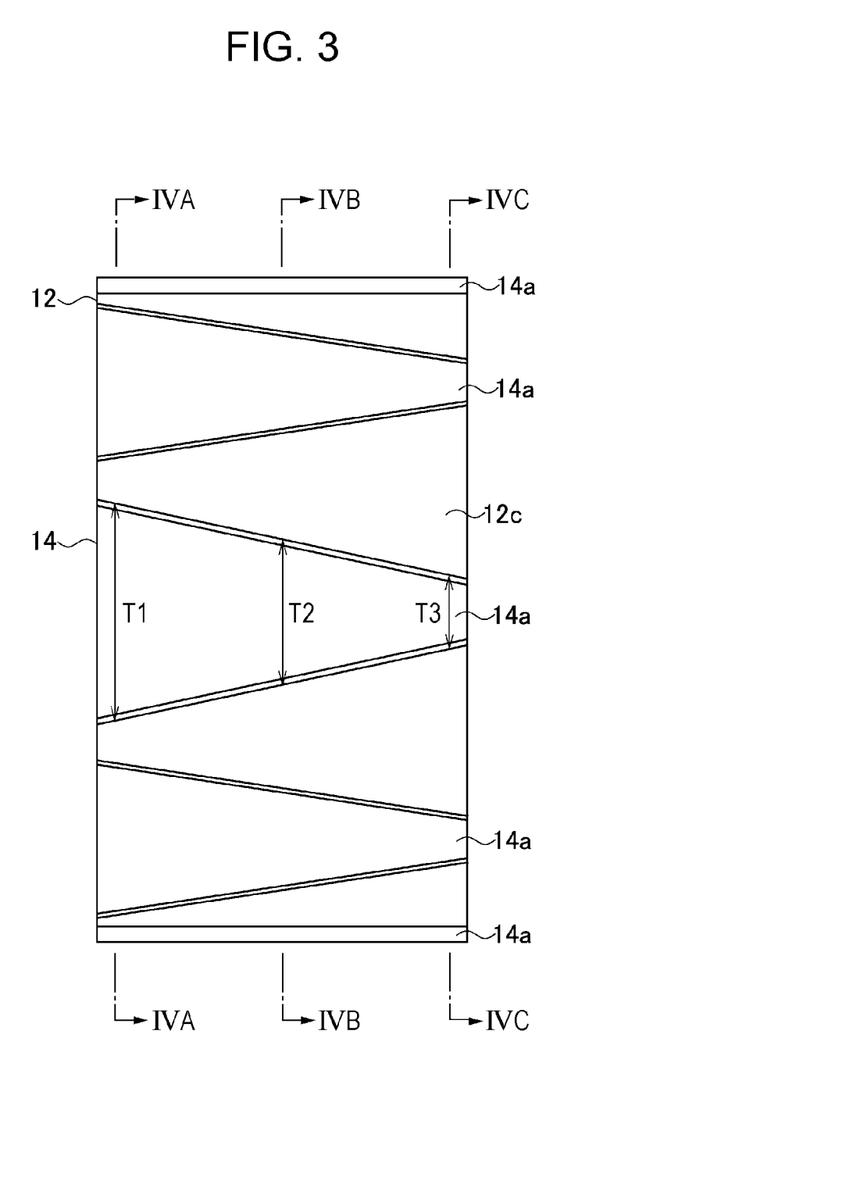
FIG. 3 is a plan view of a second torque cam member and a pulse gear illustrated in FIGS. 2A and 2B.
Figure 4A:
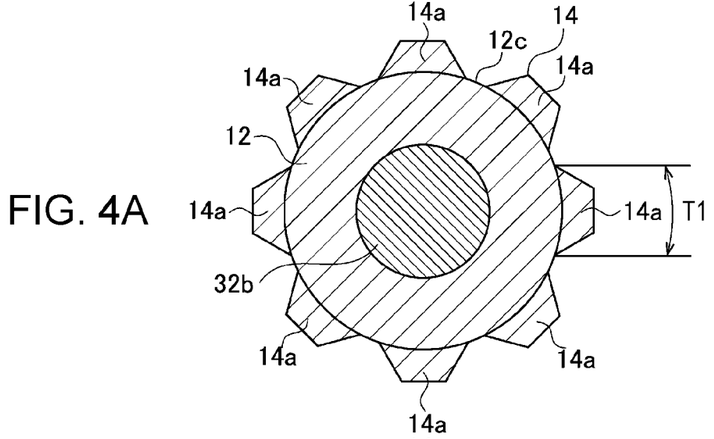
FIG. 4A is a cross-sectional view taken along line IVA-IVA.
Figure 4B:
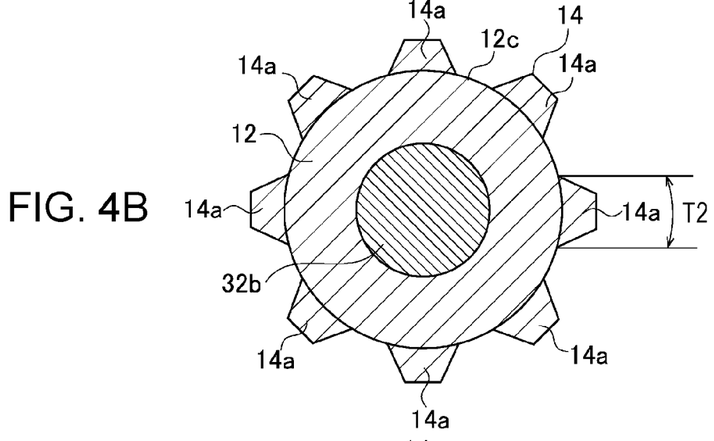
FIG. 4B is a cross-sectional view taken along line IVB-IVB.
Figure 4C:
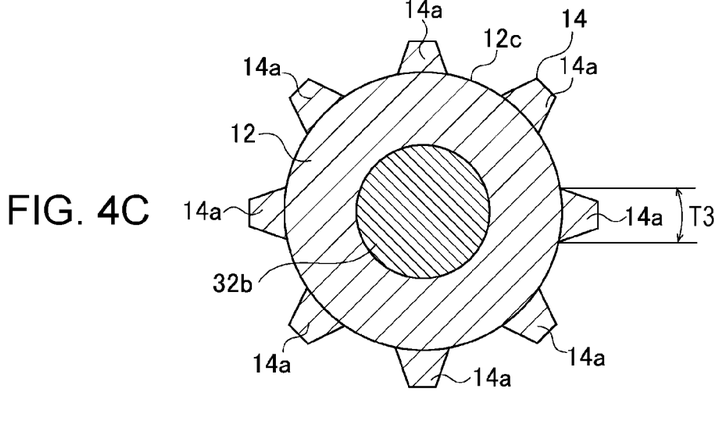
FIG. 4C is a cross-sectional view taken along line IVC-IVC.
Figure 5A:
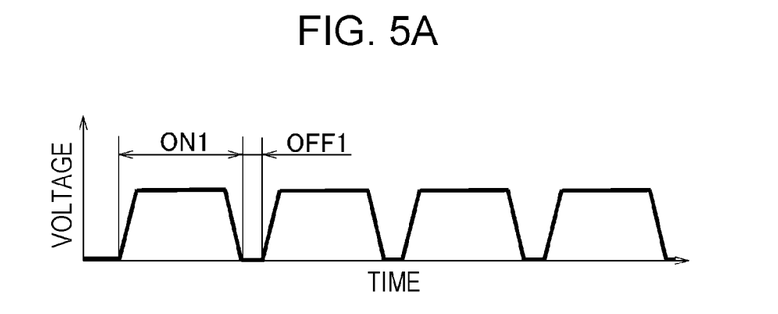
FIGS. 5A to 5C are diagrams exemplifying pulse trains detected by the rotation pulse detection sensor illustrated in FIGS. 2A and 2B.
Figure 5B:
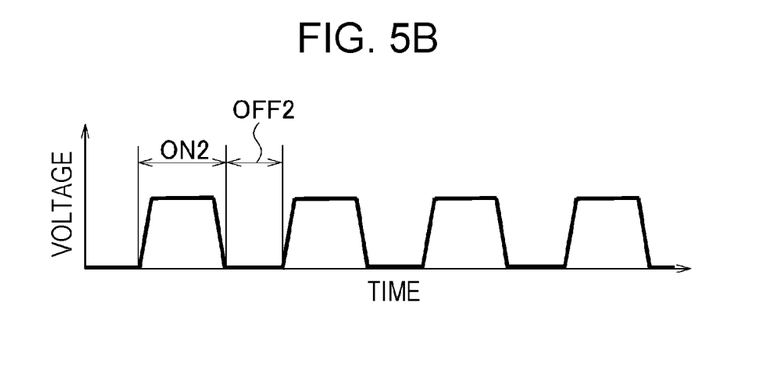
Figure 5C:
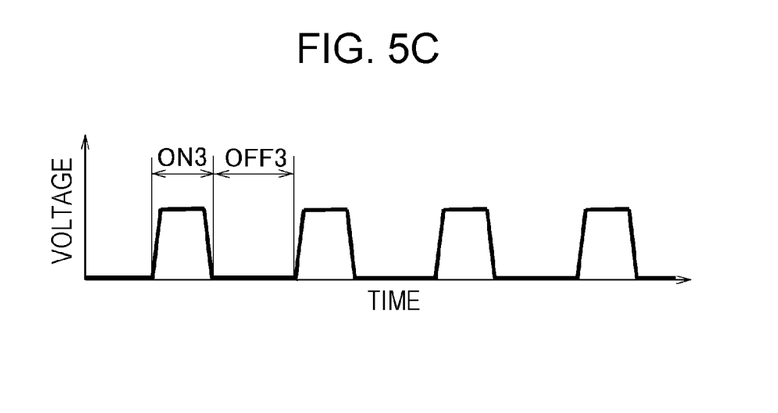

Referring not only to FIG. 1 but to FIGS. 2A to 5C as well, a description of the torque detector 1 will be given. FIGS. 2A and 2B are diagrams schematically illustrating a configuration of the torque detector 1 according to the example. FIG. 2A illustrates a case in which torque in not input to the torque detector 1 and FIG. 2B illustrates a case in which torque is input to the torque detector 1. FIG. 3 is a plan view of a second torque cam member 12 and a pulse gear 14 illustrated in FIGS. 2A and 2B. FIGS. 4A to 4C are cross-sectional views of the second torque cam member 12 and the pulse gear 14 illustrated in FIG. 3. FIG. 4A is a cross-sectional view taken along line IVA-IVA, FIG. 4B is a cross-sectional view taken along line IVB-IVB, and FIG. 4C is a cross-sectional view taken along line IVC-IVC. FIGS. 5A to 5C are diagrams exemplifying pulse trains detected by the rotation pulse detection sensor 16 illustrated in FIGS. 2A and 2B.

The torque detector 1 includes a torque cam 10 (a first torque cam member 11, the second torque cam member 12, cam balls 13), the pulse gear 14, a spring 15, the rotation pulse detection sensor 16, and a torque acquisition unit 51. The torque acquisition unit 51 is configured by execution of a part of the program, which is stored in the ROM in the TCU 50, with the microprocessor. In one example, torque cam 10 may serve as a "torque cam", the first torque cam member 11 may serve as a "first torque cam member", the second torque cam member 12 may serve as a "second torque cam member", the cam balls 13 may serve as "cam balls", the pulse gear 14 may serve as a "pulse gear", the spring 15 may serve as an "elastic member", the rotation pulse detection sensor 16 may serve as a "rotation pulse detection member", and the torque acquisition unit 51 may serve as a "torque acquisition member".

A description of the first torque cam member 11 will be given. The first torque cam member 11 is one of the members that constitute the torque cam 10. The first torque cam member 11 is substantially annular. The first torque cam member 11 is provided at an end of the output shaft 32a of the forward-reverse switching mechanism 31. In particular, the first torque cam member 11 is provided on an outer circumference of the output shaft 32a so as to be not slidable in the axial direction AD of the output shaft 32a and so as to rotate together with the output shaft 32a (so as not to relatively rotate with respect to the output shaft 32a). The first torque cam member 11 is, for example, coupled and fixed to the output shaft 32a by spline fitting.

A cam surface 11a of the first torque cam member 11 opposes a cam surface 12a of the second torque cam member 12. The cam surface 11a has cam grooves 11b at positions that oppose the cam grooves 12b of the second torque cam member 12. The cam grooves 11b are grooves that accommodate some of the cam balls 13 and in which the cam balls 13 can move, and is, for example, grooves in which the depth continuously changes.

A description of the second torque cam member 12 will be given. The second torque cam member 12 is one of the members that constitute the torque cam 10. The second torque cam member 12 is substantially annular and has a diameter that is the same as that of the first torque cam member 11. The second torque cam member 12 is provided at an end portion of the primary shaft 32b. In particular, the second torque cam member 12 is provided on an outer circumference of the primary shaft 32b so as to be slidable in the axial direction AD (a thrusting direction) of the primary shaft 32b and so as to rotate together with the primary shaft 32b (so as not to relatively rotate with respect to the primary shaft 32b). The second torque cam member 12 is, for example, coupled to the primary shaft 32b by spline fitting.

The cam surface 12a of the second torque cam member 12 opposes the cam surface 11a of the first torque cam member 12. Similar to the cam surface 11a of the first torque cam member 11, the cam surface 12a has a plurality of cam grooves 12b. The cam grooves 12b are grooves that have a similar shape to that of the cam grooves 11b.

A description of the cam balls 13 will be given. The cam balls 13 are one of the members that constitute the torque cam 10. The cam balls 13 are disposed between the cam grooves 11b of the first torque cam member 11 and the cam grooves 12b of the second torque cam member 12, and are capable of moving between the cam grooves 11b and the cam grooves 12b.

In the torque cam 10, the first torque cam member 11 rotates upon rotation of the output shaft 32a. Furthermore, in the torque cam 10, upon rotation of the first torque cam member 11, the second torque cam member 12 becomes relatively rotated through the plurality of cam balls 13, such that the torque of the first torque cam member 11 (the torque of the output shaft 32a) is transmitted to the second torque cam member 12 (the primary shaft 32b) through the plurality of cam balls 13. In the torque cam 10, the cam balls 13 move according to the size of the torque of the output shaft 32a, and a thrust force is generated in second torque cam member 12. Note that the torque transmitted to the primary shaft 32b (the primary pulley 34) is transmitted to the secondary pulley 35 through the chain 36 clamped by the clamp pressure.

A description of the pulse gear 14 will be given. The pulse gear 14 is formed on an outer circumferential surface 12c of the second torque cam member 12. The pulse gear 14 includes a plurality of teeth 14a disposed at equal intervals in a circumferential direction of the second torque cam member 12. The teeth 14a extend in the axial direction AD of the primary shaft 32b, and as illustrated in FIG. 3, the tooth thickness (the length in the circumferential direction of each tooth 14a) is formed so as to continuously become smaller in a linear manner from a first torque cam member 11 side towards a primary pulley 34 (the fixed pulley 34a) side. The teeth number of the pulse gear 14; the tooth width (the length in the axial direction AD of each tooth 14a); the maximum value, the minimum value, and the degree of change of the tooth thickness; and the like are determined based on a detection accuracy of the rotation pulse detection sensor 16 and the like so as to obtain a desired torque detection accuracy.

FIGS. 4A to 4C illustrate cross-sections of the pulse gear 14 at three different positions in the axial direction AD. FIG. 4A is a cross-section of the pulse gear 14 at a position near the first torque cam member 11, and the tooth thickness of the teeth 14a at the above position is denoted by reference sign T1. FIG. 4B is a cross-section of the pulse gear 14 at an intermediate position, and the tooth thickness of the teeth 14a at the above position is denoted by reference sign T2. FIG. 4C is a cross-section of the pulse gear 14 at a position near the fixed pulley 34a, and the tooth thickness of the teeth 14a at the above position is denoted by reference sign T3. The three tooth thicknesses at the three positions satisfies, when comparing the three positions, tooth thickness T1>tooth thickness T2>tooth thickness T3. Note that the cam balls 13 and the cam grooves 12b are not illustrated in the cross-sectional views in FIGS. 4A to 4C.

A description of the spring 15 will be given. The spring 15 is a spring that biases the second torque cam member 12 towards the first torque cam member 11. The spring 15 is disposed between a surface 12d on the other side with respect to the cam surface 12a of the second torque cam member 12 and an end surface 34d of the fixed pulley 34a. In one example, the end surface 34d may serve as a "predetermined fixing surface". The primary shaft 32b is disposed through the center of the spring 15. The spring 15 stretches and shrinks in the axial direction AD of the primary shaft 32b.

As described above, a thrust force according to the size of the torque of the output shaft 32a is generated in the second torque cam member 12. The second torque cam member 12 is moved in the axial direction AD towards the fixed pulley 34a according to the balance between the thrust force and a spring force (an elastic force) of the spring 15. The above moving amount is referred to as a "thrust moving amount". FIG. 2A illustrates a state in which there is no torque output from the output shaft 32a; accordingly, no thrust force is generated. In such a state, the second torque cam member 12 is at a position that is nearest to the first torque cam member 11 (thrust moving amount=0). FIG. 2B illustrates a state in which torque is output from the output shaft 32a; accordingly, a thrust force is generated in the second torque cam member 12 in accordance with the size of the above torque. In such a state, the spring 15 shrinks in accordance with the size of the thrust force (consequently, the size of the torque of the output shaft 32a), and the second torque cam member 12 is moved to a position that is closer to the fixed pulley 34a by the thrust moving amount.

A description of the rotation pulse detection sensor 16 will be described. The rotation pulse detection sensor 16 is a sensor that detects the teeth 14a of the rotating pulse gear 14 and that outputs a pulse train. The rotation pulse detection sensor 16 is provided at a predetermined position near the second torque cam member 12 (the pulse gear 14), and is disposed so as to oppose the pulse gear 14 with a slight gap in between. In particular, as illustrated in FIG. 2A, the rotation pulse detection sensor 16 is disposed at a position that detects the portion (an end of the pulse gear 14 on the fixed pulley 34a side) of the teeth 14a that has substantially the smallest tooth thickness when the second torque cam member 12 is positioned closest to the first torque cam member 11 (when there is no torque output from the output shaft 32a). Accordingly, as the thrust moving amount of the second torque cam member 12 becomes larger (as the second torque cam member 12 moves closer to the fixed pulley 34a), the rotation pulse detection sensor 16 detects the portion of the teeth 14a that has a larger tooth thickness. In particular, the tooth thickness of the teeth 14a detected by the rotation pulse detection sensor 16 changes in a linear manner in accordance with the change in the thrust moving amount of the second torque cam member 12. The rotation pulse detection sensor 16 is, for example, an electromagnetic pickup sensor, a sensor using an MR element, or a sensor using a Hall element.

When the teeth 14a of the pulse gear 14 are detected, the rotation pulse detection sensor 16 outputs a predetermined voltage that is higher than the voltage output when the teeth 14a are not detected. The pulse train is formed by repetition of the period in which the predetermined high voltage is output and in which the predetermined voltage is not output. In the pulse train, each period in which the predetermined high voltage is output is a pulse (ON). The pulse width (ON time) of the pulse train corresponds to the tooth thickness of the tooth 14a. When the thrust moving amount of the second torque cam member 12 changes, the tooth thickness of the teeth 14a detected by the rotation pulse detection sensor 16 changes; accordingly, each pulse width in the pulse train changes and the ON time (OFF time) changes. The pulse train from the rotation pulse detection sensor 16 is output to the torque acquisition unit 51.

FIGS. 5A to 5C exemplify pulse trains output from the rotation pulse detection sensor 16. FIG. 5A illustrates a pulse train P1 during detection of the portion in the teeth 14a in FIG. 4A that has a tooth thickness of T1 (in a case in which the thrust moving amount of the second torque cam member 12 is large), and reference sign ON1 denotes the ON time (the pulse width) and reference sign OFF1 denotes the OFF time. FIG. 5B illustrates a pulse train P2 during detection of the portion in the teeth 14a in FIG. 4B that has a tooth thickness of T2 (in a case in which the thrust moving amount of the second torque cam member 12 is intermediate), and reference sign ON2 denotes the ON time and reference sign OFF2 denotes the OFF time. FIG. 5C illustrates a pulse train P3 during detection of the portion in the teeth 14a in FIG. 4C that has a tooth thickness of T3 (in a case in which the thrust moving amount of the second torque cam member 12 is small), and reference sign ON3 denotes the ON time and reference sign OFF3 denotes the OFF time. When the three pulse trains P1, P2, and P3 are compared, ON time ON1>ON time ON2>ON time ON3 (OFF time OFF1<OFF time OFF2<OFF time OFF3) holds true.

The rate of the ON time (the time occupied by the pulses) in the pulse train from the rotation pulse detection sensor 16 corresponds to the thrust moving amount (the thrust force) of the second torque cam member 12, and becomes larger as the thrust moving amount becomes larger. The thrust moving amount of the second torque cam member 12 (the thrust force) corresponds to the size of the torque transmitted from the output shaft 32a, and becomes larger as the torque becomes larger. Accordingly, the rate of the ON time corresponds to the size of the torque transmitted from the output shaft 32a, and becomes larger as the torque becomes larger. From the above relationship, the torque output from the output shaft 32a to the primary shaft 32b can be acquired by the rate of the ON time in the pulse train. Note that other than the rate of the ON time in the pulse train, the rate of the OFF time and the like may be used to acquire the torque.

A description of the torque acquisition unit 51 will be given. The torque acquisition unit 51 is a processing unit that uses the pulse train from the rotation pulse detection sensor 16 to acquire the torque transmitted from the output shaft 32a to the primary shaft 32b. Specifically, the torque acquisition unit 51 sequentially measures the ON time and the OFF time from the pulse train, and calculates the rate of the ON time from the above ON time and OFF time from the pulse train. The method of calculating the rate includes, for example, a method of obtaining the rate by adding the ON time and the OFF time of a single pulse and dividing the ON time with the added value, and a method of obtaining the rate by adding up the ON times and the OFF times of a predetermined number of pulses and dividing the predetermined number of ON times with the added value. Subsequently, the torque acquisition unit 51 acquires the torque from the rate of the ON time. In the above acquisition method, for example, a map setting forth the relationship between the rate of the ON time and the torque is prepared and by referring to the map, the torque is acquired with the rate of the ON time.

A description of a function of the torque detector 1 configured in the above manner will be given. When there is no torque output to the output shaft 32a of the forward-reverse switching mechanism 31 (while the engine 2 is at a stop), no thrust force is generated in the torque cam 10. In such a case, the second torque cam member 12 does not move towards the fixed pulley 34a and is at the position that is closest to the first torque cam member 11.

When torque of a certain size is output from the output shaft 32a of the forward-reverse switching mechanism 31 (while the engine 2 is in operation), in the torque cam 10, the torque is transmitted through the plurality of cam balls 13 to the second torque cam member 12 (the primary shaft 32b) from the first torque cam member 11 coupled to the output shaft 32a. In the above, a thrust force is generated in the torque cam 10 in accordance with the size of the torque, and the thrust force acts on the second torque cam member 12. The second torque cam member 12 is moved towards the fixed pulley 34a in accordance with the balance between the size of the thrust force and the spring force of the spring 15.

The rotation pulse detection sensor 16 detects the tooth thickness of the portion of the teeth 14a of the pulse gear 14, which changes in accordance with the thrust moving amount, in an optional manner, and outputs the pulse train. The pulse width (the ON time) of the pulse train corresponds to the thrust moving amount of the second torque cam member 12 (consequently, the size of the torque). Using the pulse train, the TCU 50 (the torque acquisition unit 51) acquires the torque transmitted to the primary shaft 32b (the torque input to the primary pulley 34). Furthermore, on the basis of the above torque, the TCU 50 obtains the clamp pressure, and controls the valve body 40 so that the above clamp pressure is generated.

The torque detector 1 according to the example directly detects the thrust moving amount of the second torque cam member 12, which changes in accordance with the torque transmitted from the output shaft 32a to the primary shaft 32b, by using the pulse gear 14 and the rotation pulse detection sensor 16, and acquires the torque transmitted from the output shaft 32a to the primary shaft 32b; accordingly, the torque can be detected in an accurate manner. Furthermore, the torque detector 1 according to the example is advantageous in ease of assembly since the rotation pulse detection sensor 16 can be installed by merely opposing the rotation pulse detection sensor 16 with respect to the pulse gear 14 in a non-contacting manner. Furthermore, since the tooth thickness of the teeth 14a of the pulse gear 14 changes in accordance with the change in the thrust moving amount of the second torque cam member 12, the torque detector 1 according to the example is capable of detecting the torque with a single rotation pulse detection sensor 16.

Since the torque is acquired by calculating the rate of time (the ON time) in which the pulses occupy the pulse train, the torque detector 1 according to the example is capable of acquiring the torque without detecting the revolution speed of the pulse gear 14 (the second torque cam member 12 and the primary shaft 32b) per unit time. Furthermore, since the teeth 14a of the pulse gear 14 are formed such that the tooth thickness thereof becomes continuously smaller in a linear manner, the tooth thickness of the teeth 14a detected by the rotation pulse detection sensor 16 changes in accordance with the thrust moving amount of the second torque cam member 12 in a linear manner (changes proportionally), the torque detector 1 according to the example is capable of acquiring the torque in an accurate manner from the pulse train output from the rotation pulse detection sensor 16.

The torque detector 1 according to the example is capable of detecting the torque input to the primary pulley 34 in an accurate manner. Accordingly, by using the above accurately detected input torque, the margin added to the clamp pressure can be reduced (including a case in which the margin is 0). As a result, power loss of the oil pump 41 can be reduced, and the fuel consumption of the vehicle can be improved.

Although an example of the invention has been described above, the invention is not limited to the example described above and various modifications can be made. For example, in the example described above, while the invention has been applied to the torque detector 1 that detects the torque input to the continuously variable transmission 3 of the vehicle, the invention can be also applied to a torque detector that detects the torque transmitted by the rotating shaft.

In the example described above, the rotating shaft which receives the torque input to the primary pulley 34 is divided into the output shaft 32a and the primary shaft 32b, and a torque cam 10 that includes the above output shaft 32a and primary shaft 32b, the first torque cam member 11, the second torque cam member 12, and the plurality of cam balls 13 is provided. However, a torque cam with another configuration may be used as the torque cam, or the torque cam may be provided on a single rotating shaft without dividing the rotating shaft.

In the example described above, while the pulse gear 14 is configured to have a plurality of teeth 14a, the pulse gear 14 may be configured to have a single tooth 14a.

In the example described above, the torque is acquired by using the rate of the ON time in the pulse train output from the rotation pulse detection sensor 16; however, the torque may be acquired by another method using the pulse train. For example, the torque may be acquired by using the ON time and the revolution speed of the primary shaft 32b per unit time.

In the example described above, the tooth thickness of the teeth 14a of the pulse gear 14 becomes continuously smaller in a linear manner from the first torque cam member 11 side towards the fixed pulley 34a side; however, the tooth thickness may become continuously larger from the first torque cam member 11 side to the fixed pulley 34a side, or the tooth thickness may continuously become smaller or larger in a non-linear manner.

The invention claimed is:

1. A torque detector comprising:
a torque cam disposed on a rotating shaft and movable in an axial direction of the rotating shaft in accordance with torque input to the rotating shaft;
a pulse gear comprising at least one tooth formed on an outer circumferential surface of the torque cam;
a rotation pulse detection member disposed so as to oppose the pulse gear, the rotation pulse detection member being configured to detect the at least one tooth of the pulse gear in rotation and configured to output a pulse train; and
a torque acquisition member configured to acquire the torque from the pulse train output by the rotation pulse detection member,
wherein the at least one tooth extends in the axial direction and is formed such that a tooth thickness becomes continuously larger or smaller from a first side to a second side in the axial direction.

2. The torque detector according to claim 1,
wherein the rotating shaft comprises a first rotating shaft and a second rotating shaft disposed coaxially with the first rotating shaft, and torque is transmitted from the first rotating shaft to the second rotating shaft,
wherein the torque cam comprises a first torque cam member provided on an outer circumference of the first rotating shaft so as to rotate together with the first rotating shaft, a second torque cam member provided on an outer circumference of the second rotating shaft so as to rotate together with the second rotating shaft and to move in an axial direction of the second rotating shaft, and cam balls disposed between a cam surface of the first torque cam member and a cam surface of the second torque cam member,
wherein the torque detector further comprises an elastic member disposed between a surface on an opposite side of the second torque cam member with respect to the cam surface of the second torque cam member and a predetermined fixing surface, the elastic member being configured to be stretched and shrank in the axial direction in accordance with a thrust force acting on the second torque cam member with the torque transmitted from the first rotating shaft, and
wherein the pulse gear is provided on an outer circumferential surface of the second torque cam member.

3. The torque detector according to claim 2,
wherein the at least one tooth is formed such that the tooth thickness becomes continuously larger or smaller in a linear manner from the first side to the second side in the axial direction.

4. The torque detector according to claim 2,
wherein the torque acquisition member is configured to calculate a rate of time in which pulses occupy the pulse train, and is configured to acquire the torque on the basis of the rate.

5. The torque detector according to claim 4,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

6. The torque detector according to claim 3,
wherein the torque acquisition member is configured to calculate a rate of time in which pulses occupy the pulse train, and is configured to acquire the torque on the basis of the rate.

7. The torque detector according to claim 6,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

8. The torque detector according to claim 3,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

9. The torque detector according to claim 2,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

10. The torque detector according to claim 1,
wherein the at least one tooth is formed such that the tooth thickness becomes continuously larger or smaller in a linear manner from the first side to the second side in the axial direction.

11. The torque detector according to claim 10,
wherein the torque acquisition member is configured to calculate a rate of time in which pulses occupy the pulse train, and is configured to acquire the torque on the basis of the rate.

12. The torque detector according to claim 11,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

13. The torque detector according to claim 10,
wherein the first rotating shaft is an output shaft of torque of an engine of a vehicle,
wherein the second rotating shaft is an input shaft of torque of a continuously variable transmission of the vehicle, and
wherein the torque acquisition member is configured in a controller of the continuously variable transmission.

14. The torque detector according to claim 1,
wherein the torque acquisition member is configured to calculate a rate of time in which pulses occupy the pulse train, and is configured to acquire the torque on the basis of the rate.

15. The torque detector according to claim 14,
wherein the first rotating shaft is an output shaft of torque of an engine of a vehicle,
wherein the second rotating shaft is an input shaft of torque of a continuously variable transmission of the vehicle, and wherein the torque acquisition member is configured in a controller of the continuously variable transmission.

* * * * *